United States Patent [19]

Ebra et al.

[11] 4,423,159
[45] Dec. 27, 1983

[54] PHENOLIC CATION EXCHANGE RESIN MATERIAL FOR RECOVERY OF CESIUM AND STRONTIUM

[75] Inventors: Martha A. Ebra; Richard M. Wallace, both of Aiken, S.C.

[73] Assignee: The United States of America as represented by the United States Department of Energy, Washington, D.C.

[21] Appl. No.: 375,232

[22] Filed: May 5, 1982

[51] Int. Cl.³ .......................................... B01J 39/18
[52] U.S. Cl. ...................................................... 521/35
[58] Field of Search ......................................... 521/35

[56] References Cited

U.S. PATENT DOCUMENTS

| | | | |
|---|---|---|---|
| 3,313,779 | 4/1967 | White | 260/59 |
| 3,936,399 | 2/1976 | Hirai et al. | 260/51.5 |
| 4,028,284 | 6/1977 | Hirai et al. | 260/54 |
| 4,107,141 | 8/1978 | Moiseer et al. | 528/148 |

FOREIGN PATENT DOCUMENTS 55-27347  2/1980  Japan ................................ 521/35

Primary Examiner—Joseph L. Schofer
Assistant Examiner—Peter F. Kulkosky

[57] ABSTRACT

A phenolic cation exchange resin with a chelating group has been prepared by reacting resorcinol with iminodiacetic acid in the presence of formaldehyde at a molar ratio of about 1:1:6. The material is highly selective for the simultaneous recovery of both cesium and strontium from aqueous alkaline solutions, such as, aqueous alkaline nuclear waste solutions. The organic resins are condensation polymers of resorcinol and formaldehyde with attached chelating groups. The column performance of the resins compares favorably with that of commercially available resins for either cesium or strontium removal. By combining $Cs^+$ and $Sr^{2+}$ removal in the same bed, the resins allow significant reduction of the size and complexity of facilities for processing nuclear waste.

5 Claims, 3 Drawing Figures

BREAKTHROUGH CURVES FOR NEW RESORCINOL-IDA RESIN AND CS-100

ELUTION CURVE FOR $Cs^+$ FROM IDA-RB3 USING 0.2 M HCOOH

PHENOLIC CATION EXCHANGE RESIN MATERIAL FOR RECOVERY OF CESIUM AND STRONTIUM

BACKGROUND OF THE INVENTION

Field Of The Invention And Contract Statement

The invention relates to cation exchange resins, preparation processes therefor and processes of using such exchange resins. The U.S. Government has rights in this invention pursuant to Contract No. DE-AC90-76SR00001 between the U.S. Department of Energy and E. I. DuPont de Nemours & Co., Savannah River Laboratory.

DISCUSSION OF BACKGROUND AND PRIOR ART

Ion-exchange resins are organic compounds, compounds synthetically polymerized, which contain positively and negatively charged units (ions)—one of the types of ions is readily replaceable by another ionic unit of similar charge from a surrounding solution. The ion-exchange resins are cationic or anionic.

Two separate types of resins, that is, the chelating resins and the electron-exchange resins, are commonly classed as ion-exchange resins. Chelating resins are, for example, styrene-divinylbenzene polymers to which functional iminodiacetate groups are introduced. Such functional group forms complexes with all of the metallic elements except the alkali metals, with stabilities that vary with the different metals.

It is particularly important to remove the long-lived fission product cesium-137 from radioactive wastes. Cesium-137 and strontium-90 are the major radioactive components in the soluble fraction of alkaline defense waste from the Department of Energy's Savannah River Plant. Phenolic ion exchange resins have a high selectivity for cesium even in the presence of large excesses of sodium. See: Baumgarten, P. K., M. A. Ebra, L. L. Kilpatrick, and L. M. Lee, "Ion Exchange Processes for Decontaminating Alkaline Radioactive Waste", presented at *Waste Management*, '81, Tucson, Arizona (Feb. 23-26, 1981); Wallace, R. M., and R. B. Ferguson, "Development of an Improved Ion-Exchange Process for Removing Cesium and Strontium from High-Level Radioactive Waste", presented at the *International Symposium on the Scientific Basis of Nuclear Waste Management*, Boston, Mass. (Nov. 16-20, 1980); and Baumgarten, P. K., R. M. Wallace, D. A. Whitehurst, and J. M. Steed, *Scientific Basis for Nuclear Waste Management* 2, Clyde J. M. Northup, Jr., et al., eds., Plenum Press, Boston, Mass. (1980), pp. 875-884. Currently the Savannah River Plant uses Amberlite ® IRC-718 (Rohm and Haas Co.), a chelating ion exchange resin, for strontium-90 removal. The chelating group present in the IRC-718 resins is iminodiacetic acid.

SUMMARY OF THE INVENTION

An object of the invention is to provide a one stage synthesis for producing a cation exchange resin. Another object is to provide a cation exchange resin which can be used to remove both cesium and strontium from an aqueous alkaline solution. A further object is to provide a cation exchange resin which has high selectivity for cesium over a broad alkaline pH range, and in the presence of high concentrations of sodium ion. A still further object is to provide a phenolic cation exchange resin with a chelating group. A still further object is to provide a process for recovering both cesium and strontium from an aqueous alkaline solution such as an aqueous alkaline nuclear waste solution. Other objects and advantages of the invention are set out herein or are obvious herefrom to one ordinarily skilled in the art.

The objects and advantages of the invention are achieved by the method of the invention.

To achieve the foregoing and other objects and in accordance with the purpose of the invention, as embodied and broadly described herein the process of the invention involves a method of preparing a phenolic cation exchange material having a chelating group for selectively recovering cesium or strontium or both from an aqueous alkaline solution containing such cesium or strontium or both. The method includes reacting resorcinol or 2,4-dihydroxybenzoic acid with iminodiacetic acid or catechol in the presence of formaldehyde in an alkaline medium to form a condensation polymer gel. The condensation polymer gel is dried. Then the dried polymer gel is comminuted to form the phenolic cation exchange material. Preferably the cation exchange resin is prepared from formaldehyde, resorcinol and iminodiacetic acid. Preferably the aqueous alkaline solution is an aqueous alkaline nuclear waste solution containing both cesium and strontium. The exchange resin of the invention can be used to remove cesium or strontium, when only one or the other is present, but the resin provides outstanding performance when both are present. Also, preferably reaction step (a) is conducted at a pH of between 6.0 and 12.5 and at a temperature of between 60° C. and 98° C.

In the phenolic cation exchange resin of the invention, preferably the molar ratio of resorcinol to iminodiacetic acid to formaldehyde is from about 1:1:5 to about 1:1:8. Most preferably the molar ratio of resorcinol to iminodiacetic acid to formaldehyde is about 1:1:6.

Unlike the prior art syntheses which involve distinct stages, namely, acid-catalyzed aminoalkylation in suspension, and acid- or base-catalyzed condensation, the synethesis of the invention resin involves a base-catalyzed, one-phase, one-sequence synthesis.

The invention also includes a phenolic cation exchange material having a chelating group for selectively recovering cesium or strontium or both from an aqeous alkaline solution containing such cesium or strontium or both. The phenolic cation exchange material is prepared by the process of the invention. The resorcinol is aminoalkylated, and a condensation polymer is formed. The polymeric skeleton consists of resorcinol-methylene units.

Preferably the cation exchange resin is prepared from formaldehyde, resorcinol and iminodiacetic acid.

The ion exchange resin material of the invention is quite useful in the recovery of cesium and strontium from nuclear waste solutions. The exchange resin of the invention is highly efficient in the removal of dissolved cesium and strontium from alkaline high level wastes. The exchange resin of the invention has five times the cesium selectivity present in the best commercially available resins, and its strontium selectivity is comparable to that found in commercially available chelating resins. The combination of resorcinol and iminodiacetic acid gives a resin that is selective for both cesium and strontium.

The phenolic exchange resins of the invention have excellent stability.

The invention further includes a process for the simultaneous recovery of cesium or strontium or both from an aqueous alkaline solution containing such cesium or strontium or both. The aqueous alkaline solution is with a phenolic chelating resin material to sorb the cesium or strontium or both from the aqueous alkaline solution. The phenolic chelating resin material is prepared by the process of the invention.

Preferably the cation exchange resin is prepared from formaldehyde, resorcinol and iminodiacetic acid. Preferably the aqueous alkaline solution is an aqueous alkaline nuclear waste solution containing cesium or strontium or both. Also, preferably the loaded resin is eluted with formic acid to recover the cesium and strontium.

A specific embodiment for which the invention is quite proficient is a process for decontaminating an alkaline nuclear waste solution containing cesium and strontium values. The waste solution is contacted with a phenolic chelating ion exchange resin. The resin is prepared: by reacting resorcinol with iminodi cetic acid in the presence of formaldehyde at a pH of about 9 and temperature of about 95° C. to form a gel, and drying the gel at about 80° C. to form a resin material and comminuting the dried resin material to form an ion exchange resin. The solution which has been decontaminated of cesium and strontium is recovered.

The exchange resin of the invention allows the separation of cesium ($Cs^+$) and strontium ($Sr^{2+}$) using the same ion exchange bed. When dealing with nuclear waste, cesium and strontium are some times separately isolated and concentrated, and then these radionuclides are incorporated into borosilicate glass to immobilize them. If such scheme were used, and cation exchanged therein, it has been found that the preferred cation exchange resins are Duolite ® CS-100 (Diamond Shamrock Corp.) for cesium removal and Amberlite ® IRC-718 (Rohm and Haas Co.) for strontium removal. But such scheme requires separate cesium and strontium removal beds. The bifunctional resins of the invention show high selectivities for both cesium and strontium, and accordingly obviate separate cesium and strontium removal beds in a defense waste processing facility.

Phenolic ion exchange resins have a high selectivity for cesium even in the presence of large excesses of sodium. This selectivity, highly dependent on alkalinity, decreases significantly below pH 12. The pH dependence strongly indicates that the hydroxyl group of the phenolic resins determines the cesium selectivity. To further increase the cesium selectivity, resorcinol, with two hydroxyl groups, rather than phenol, was used to form condensation polymers with formaldehyde. The high selectivity for cesium even in the presence of a large excess of sodium ion is an important, unexpected advantage.

Reference will now be made in detail to the present preferred embodiment of the invention, an example of which is illustrated in the accompanying drawings.

A BRIEF DESCRIPTION OF THE INVENTION

The accompanying drawings, which are incorporated in and from a part of the specification, illustrate the invention and, together with the description, serve to explain the principles of the invention. In the drawings:

FIG. 1 is a flow diagram of the process;
FIG. 2 is breakthrough curves; and
FIG. 3 is an elution curve.

DETAILED DESCRIPTION OF THE INVENTION

All parts, percentages, ratios and proportions are on a weight basis unless otherwise stated herein or obvious herefrom to one ordinarily skilled in the art.

Figure 1:
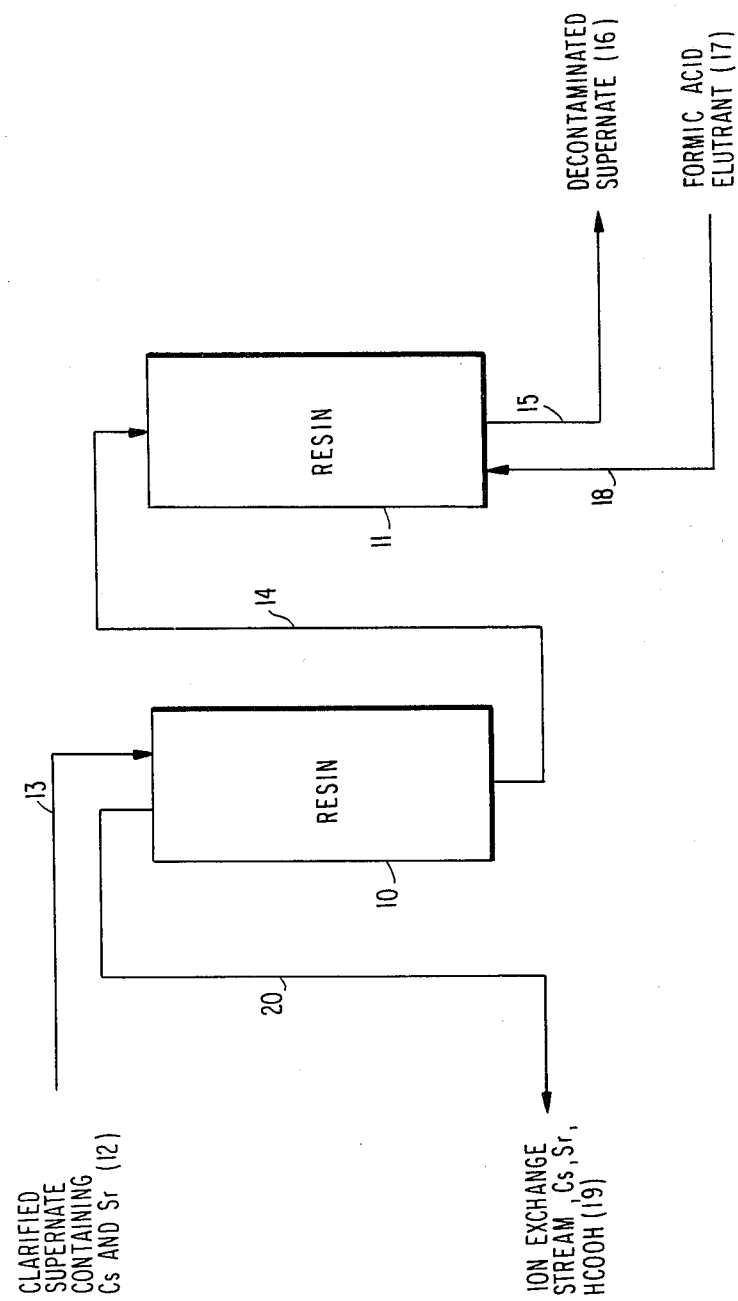

Referring to FIG. 1, a preferred embodiment is disclosed wherein ion exchange columns 10 and 11 are used in series. Columns 10 and 11 contain the cation exchange resin of the invention. Clarified alkaline supernate (12) containing Cs and Sr enters the top of column 10 via line 13, exits from the bottom of column 10 and enters the top of column 11 via line 14, and exits from the bottom of column 11 via line 15 as decontaminated supernate (16) stripped of Cs and Sr. Formic acid elutrant (17) travels countercurrent to the supernate. The elutrant (17) enters the bottom of column 11 via line 18. The loaded elutrant (19) exits column 10 via line 20. The loaded elutrant (19) contains the Cs and Sr stripped from the supernate (12).

Amines, such as, iminodiacetic acid, react with phenols in the presence of formaldehyde to form benzyl amines with acid or base as catalyst, namely:

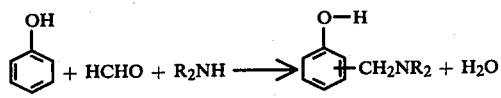

Phenols react with formaldehyde, again in acid or base, to form condensation polymers. By combining these two steps, a phenolic resin containing amino chelating groups were prepared. Iminodiacetic acid (IDA) has the formula $HN(CH_2CO_2H)_2$; resorcinol is also termed m-dihydroxybenzene. As cesium selectivity is related to the phenolic groups on the resin, resorcinol is excellent as the phenolic compound because it has two -OH groups. Iminodiacetic acid provides an excellent chelating amino group. To repeat, by combining the formaldehyde condensation of resorcinol with IDA aminoalkylation, the $Sr^{2+}$ chelating resin with high cesium selectivity of the invention was obtained.

Resorcinol provided the best and preferred cesium chelating entity having very high cesium selectivity. 2,4-dihydroxybenzoic acid (DHBA) gave resins of very high cesium selectivity and good physical properties, so DHBA can be used within the scope of the invention. Attempts to condense pyrogallol resulted in a base-unstable resin, so not all resorcilic compounds are useful within the scope of the invention.

The vicinal hydroxyl groups in catechol provide strontium chelating properties. Condensation copolymers of catechol and resorcinol have good strontium chelating results. However, iminodiacetic acid is preferred because it provides the best strontium chelating group.

The term formaldehyde, as used herein, includes polymers of formaldehyde such as para-formaldehyde. Other aldehydes, which can be used in place of formaldehyde, are for example, acetaldehyde, glutaraldehyde, pyruvic aldehyde, cinnamaldehyde, propionaldehyde, butyraldehyde, isobutyraldehyde, valeraldehyde, crotonaldehyde, 3-cyclohexene-1-carboxaldehyde, 3-(methylthio)propionaldehyde, benzaldehyde, p-chlorobenzaldehyde, napthaldehyde and furfural.

The pH used in the resin formation step is usually from 6.0 to 12.5, preferably from 7.5 to 12.5 and most preferably about 9. Acid synthesis results in a fine, bright-orange powder when using resorcinol, iminodiacetic acid and formaldehyde. Base-catalyzed exchange resin had high cesium selectivity and its physical properties are better for column operation.

The temperature used in the resin formation step is preferably between 60° C. and 98° C. and most preferably about 95° C.

Preferably the gel is dried at a temperature of about 80° C.

In this specification, the initial and final concentrations of $Cs^+$ and $Sr^{2+}$ were determined by gamma counting, and distribution coefficients, $K_d$, in mL/g were calculated using the following equation:

$$K_d = \frac{mL \text{ solution}}{g \text{ resin}} \left[ \frac{\text{initial solution counts}}{\text{final solution counts}} - 1 \right]$$

EXAMPLE 1

Iminodiacetic acid and resorcinol (1:1 mole ratio) were dissolved together in a minimum amount of water at room temperature—several solutions were prepared. With one solution, the pH was adjusted to a pH of 1.5 with 3 M HCl and, with three other solutions, the pH was adjusted to a pH of 9 with 6 M NaOH. Excess formaldehyde (mole ratio of 6) was added in each case. The solutions were stirred and heated to a temperature of about 95° C. Acid synthesis resulted in a fine, bright-orange powder. The acid-catalyzed resorcinol-IDA resin was termed IDA-RA. Basic synthesis produced a reddish-brown gel which hardens by drying and can be ground to appropriate size. In the case of each of base-catalyzed reactions, the resulting gel was dried in an oven at about 80° C. The hard, brittle solids that formed were ground in a mill, and sieved in a 40–60 mesh, U.S. standard sieve, for resin characterization work. The resin of the invention is the base-catalyzed product because its cesium selectivity is higher than the acid-catalyzed resin, and its physical properties are better for column operation. The three base-catalyzed resorcinol IDA resins were termed IDA-RB1, IDA-RB2 and IDA-RB3, respectively.

Distribution coefficients (Kd) of strontium and cesium were determined for both the acid-catalyzed and base-catalyzed resins. For comparison, Kd's were determined under the same conditions using commercial resins CS-100 and IRC-718. (A-1 Kd's are the average of two measurements.) Table I below shows the results obtained:

TABLE I

Distribution Coefficients In Simulated Supernate
($2.5 \times 10^{-4}$M $Cs^+$, $1.0 \times 10^{-6}$M $Sr^{2+}$)

| Resin | $Cs^+$ ($K_d$) | $Sr^{2+}$ ($K_d$) |
|---|---|---|
| IDA-RB1 | 1600 | 1100 |
| IDA-RB2 | 580 | — |
| IDA-RB3 | 700 | 477 |
| IDA-RA | — | 1420 |
| Duolite ® CS-100 | 143 | — |
| Amberlite ® IRC-718 | — | 652 |

Table I is a summary presentation.

The most promising resins were identified by determining distribution coefficients for $Cs^+$ and $Sr^{2+}$, so the Kd's were determined in solutions of either synthetic supernate (1 M $OH^-$) or pH 13.8 sodium nitrate (4.7 M $Na^+$). Cesium concentration was $2.5 \times 10^{-4}$ M; strontium, $1 \times 10^{-6}$ M. Experimentally, 0.1 gram of resin was equilibrated for 18 hours with 15 mL of solution. One of two equilibrating solutions was used, either a 4.0 M $NaNO_3$–1.5 M NaOH solution or a simulated supernate solution. Both solutions were $2.5 \times 10^{-4}$ M $Cs^+$ and $1.0 \times 10^{-6}$ M $Sr^{2+}$. Either $^{137}Cs^+$ or $^{85}Sr^{2+}$ was added as a tracer. Cesium $K_d$ in 2 M formic acid was also run to determine ease of elution. The composition of the simulated supernate solution is given in Table II below:

TABLE II

Composition Of Simulated Supernate

| Ion | Molarity |
|---|---|
| $Na^+$ | 4.7 |
| $OH^-$ | 1.0 |
| $NO_3^-$ | 1.7 |
| $NO_2^-$ | 0.8 |
| $AlO_2^-$ | 0.4 |
| $CO_3^{2-}$ | 0.2 |
| $SO_4^{2-}$ | 0.2 |

The test results are given in detail in Table III below:

TABLE III

Distribution Coefficients Of $Cs^+$ And $Sr^{2+}$ On Phenolic Chelating Resins

| Resin | Initial Concentration | Equilibrium Concentration | $K_d$ |
|---|---|---|---|
| Cesium In $NaNO_3$ 4.0M, NaOH 2M | | | |
| IDA-RA | $2.50 \times 10^{-4}$ | $1.57 \times 10^{-4}$ | 95 |
| IDA-RB1 | $2.50 \times 10^{-4}$ | $2.43 \times 10^{-5}$ | 1380 |
|  |  | $2.47 \times 10^{-5}$ | 1360 |
| CS-100 | $2.50 \times 10^{-4}$ | $1.49 \times 10^{-4}$ | 102 |
|  |  | $1.46 \times 10^{-4}$ | 105 |
| Cesium In Synthetic Supernate, 1M $OH^-$ | | | |
| IDA-RB1 | $2.50 \times 10^{-4}$ | $2.12 \times 10^{-5}$ | 1600 |
| IDA-RB2 | $2.50 \times 10^{-4}$ | $1.07 \times 10^{-4}$ | 580 |
| IDA-RB3 | $2.50 \times 10^{-4}$ | $4.39 \times 10^{-5}$ | 700 |
| Cesium In 2M Formic Acid | | | |
| IDA-RB1 | $2.50 \times 10^{-4}$ | $2.47 \times 10^{-4}$ | 1.9 |
| Strontium In Synthetic Supernate | | | |
| IDA-RA | $1 \times 10^{-6}$ | $9.55 \times 10^{-8}$ | 1420 |
| IDA-RB1 | $1 \times 10^{-6}$ | $1.27 \times 10^{-7}$ | 1100 |
| IDA-RB3 | $1 \times 10^{-6}$ | $2.39 \times 10^{-7}$ | 477 |
| IRC-718 | $1 \times 10^{-6}$ | $1.86 \times 10^{-7}$ | 650 |

EXAMPLE 2

The procedure of Example 1 was repeated several times, alkaline pH version, to prepare certain exchange resins. Table IV below sets out the components of the resins, the molar ratios (if other than that of Example 1), and the distribution coefficients:

TABLE IV

Distribution Coefficients, mL/g (4.0M $NaNO_3$, 1.5M NaOH, $2.5 \times 10^{-4}$M $Cs^+$, $1.0 \times 10^{-6}$ $Sr^{2+}$ test solution)

| Resin | $Cs^+$ ($K_d$) | $Sr^{2+}$ ($K_d$) |
|---|---|---|
| Resorcinol-Catechol Resins | | |
| Resorcinol | 654 | — |
| Catechol | 26 | 1910 |
| Resorcinol-Catechol 2:1 | 189 | 655 |

TABLE IV-continued

Distribution Coefficients, mL/g (4.0M NaNO$_3$, 1.5M NaOH, 2.5 × 10$^{-4}$M Cs$^+$, 1.0 × 10$^{-6}$ Sr$^{2+}$ test solution)

| Resin | Cs$^+$ (K$_d$) | Sr$^{2+}$ (K$_d$) |
| --- | --- | --- |
| Resorcinol-Catechol 2:3 | 78 | 1030 |
| DHBA[1] | 1400 | 104 |
| DHBA-Catechol 1:1 | 76 | 1210 |
| Iminodiacetic Acid Resins | | |
| IDA-RB4[2] | 2210 | 470 |
| IDA-RB5 | 666 | 2200 |
| IDA-RA | 95 | — |
| Candidate Resins | | |
| Duolite ® CS-100 | 97 | 163 |
| Amberlite ® IRC-718 | <1 | 3080 |

Notes:
[1]DHBA is 2,4-dihydroxybenzoic acid.
[2]IDA-RB4 and IDA-RB5 are base-catalyzed resorcinol-IDA resins.

EXAMPLE 3

The procedure of Example 1 was repeated three times, alkaline pH version, with the syntheses of resorcinol-IDA resins being performed at 60°, 100° and 142° C., respectively, in a vacuum oven with a N$_2$ atmosphere to determine the effects on resin quality. The molar composition was 1:1:6 of resorcinol:IDA:formaldehyde. Table V below shows values of K$_d$ in the simulated supernate (of Example 1) for the resorcinol-IDA resins prepared at 3 different temperatures:

TABLE V

Distribution Coefficients[1], mL/g, For Resorcinol-IDA Resins Prepared At Three Temperatures

| Synthesis Temperature, (°C.) | Cs$^+$ (K$_d$) | Sr$^{2+}$ (K$_d$) |
| --- | --- | --- |
| 60 | 350 | 890 |
| 100 | 2700 | 510 |
| 142 | 1500 | 86 |

Note:
[1]18-40 mesh, wet H$^+$ form, in simulated supernate. The K$_d$'s of Cs$^+$ exhibited a maximum around 100° C. The K$_d$'s of decreased linearly with increasing synthesis temperature.

EXAMPLE 4

The sodium capacity of IDA-RB3 was determined. Table VI below shows the values obtained for resin and for CS-100 under the same conditions:

TABLE VI

Sodium Capacity Of Dry (96° C.) Na$^+$ Form IRA-RB3 And CS-100 At pH 13

| Resin | Observed capacity (meq/g) | (meq/mL)[1] | Theoretical capacity (meq/g) |
| --- | --- | --- | --- |
| IDA-RB3 | 4.63 | 1.36 | 11.3 |
| CS-100 | 4.36 | 1.80 | 10.3 |
| Capacity Ratio IDA-RB3/CS-100 | 1.06 | 0.76 | 1.10 |

Note:
[1]1M NaOH.

These values are obtained by reacting a known amount of Na$^+$-form resin with an excess, measured amount of standard HCl and titrating the excess with standard NaOH. Stoichiometric calculations predict a sodium capacity ratio of IDA-RB3/CS-100 of 1.06. The actual ratio of 1.10 is very close to the predicted ratio. In both resins the theoretical capacity, assuming all functional groups remain active after polymerization, is 2.4 times greater than the observed capacity.

The column runs were conducted on two milliliter columns having a synthetic supernate 1.0 M in OH$^-$ and 4.7 M Na$^+$. To obtain preliminary results quickly, the runs were conducted at fairly fast flow rates (3.1 CV/hr). For the cesium runs the synthetic supernate contained 2.5×10$^{-4}$ M Cs$^+$ and $^{137}$Cs tracer. For the strontium one, it contained 1.0×10$^{-6}$ M Sr$^{2+}$ and $^{85}$Sr tracer.

EXAMPLE 5

Figure 2:
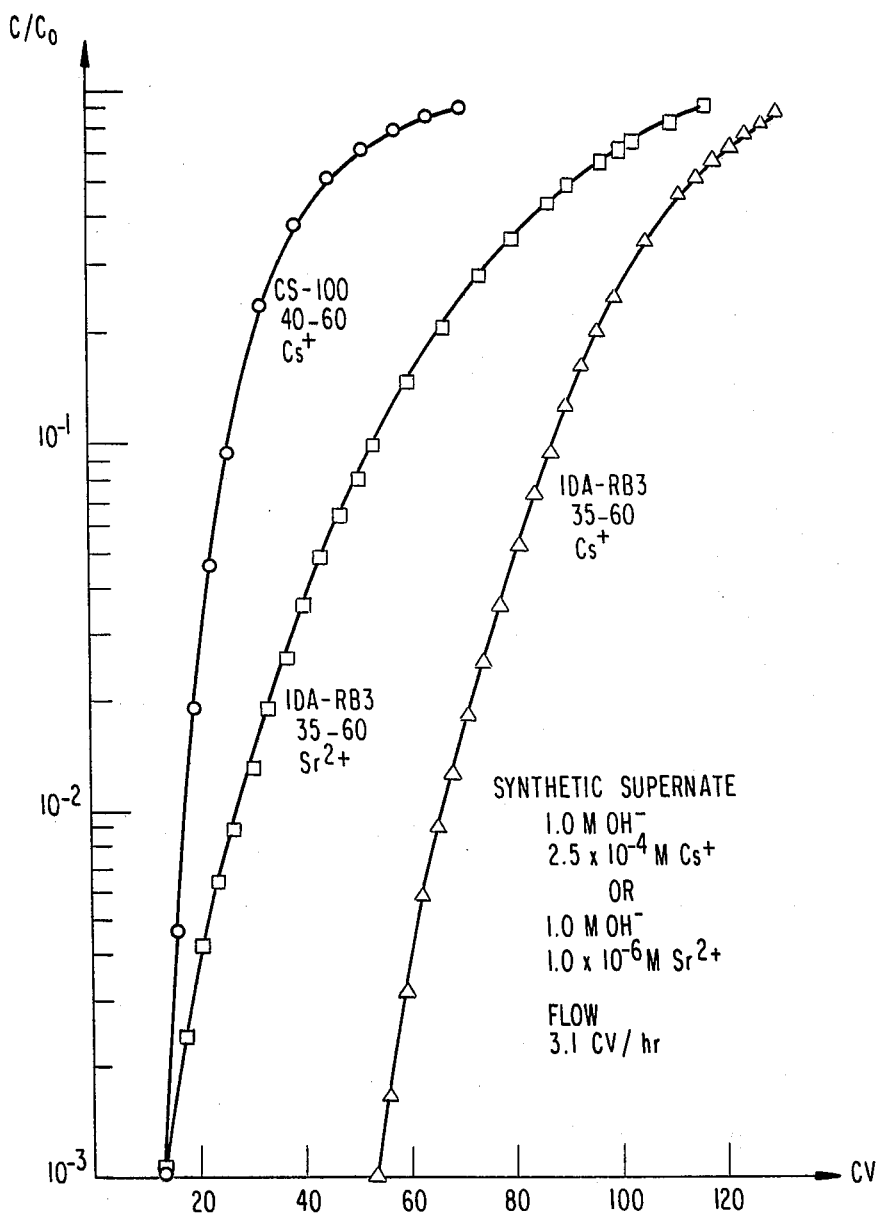
Figure 3:
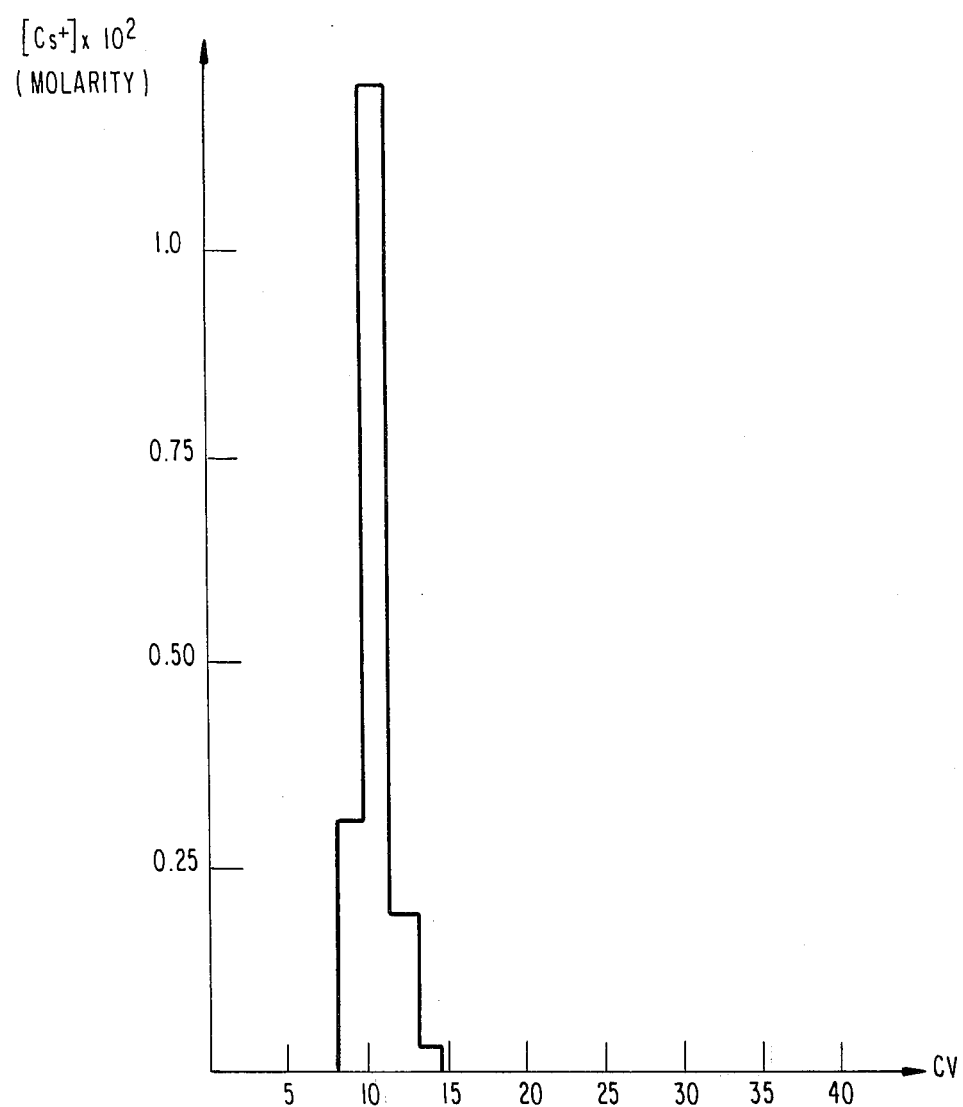

Two column runs were conducted on one batch of IDA-RB3 to assess the potential performance of these resins in column operation. Both runs were conducted in simulated supernate containing 2.5×10$^{-4}$M Cs$^+$ and 1.0×10$^{-6}$ M Sr$^{2+}$. $^{137}$Cs$^+$ was used in one run and $^{85}$Sr$^{2+}$ in the other to determine breakthrough curves by gamma counting. The resin bed was 2 mL in volume in fully expanded Na$^+$ form. Feed and elution flow rates were 3.1 resin bed volumes, CV, per hour (see FIG. 2). After each run, the bed was eluted with 0.2 M HCOOH (see FIG. 3). Strontium co-elutes with cesium. Although IDA-RB3 is not the best of the resins prepared thus far, its cesium column breakthrough capacity is 4.2 times that of CS-100, and its strontium capacity is comparable to that of commercial resin IRC-718. The runs produced good sodium-radionuclide splits. At fast flow (3.1 CV/hr) with 0.2 M formic acid, 65 percent of the sodium was split from the cesium and 52 percent from the strontium.

Also, an elution run was conducted using resin IDA-RB3 that had been wet sieved to obtain 20-60 mesh fraction. Commercially available IRC-718 contains at least 50 percent material coarser than 20 mesh. This may contribute to the poor column performance of the resin. Breakthrough of strontium increased by 10 column volumes (25 percent) and a 47 percent sodium split can be obtained using 0.2 M formic acid.

EXAMPLE 6

All of the exchange resins in Examples 1 to 3 were tested for chemical stability. All of the resins were cycled through two sequential soakings in 6 M NaOH and in 2 M formic acid to determine if the resins could survive the chemical environment when repeatedly loaded and eluted. A final soaking with 6 M NaOH was followed by a 0.1 M NaOH wash. The pyrogallol resin did not survive the first 6 M NaOH soaking.

By way of summary, the invention involves novel bifunctional resins for simultaneous cesium and strontium removal. These resins are condensation polymers of resorcinol and formaldehyde with chelating functionalities. The chelating groups iminodiacetic acid (IDA) and catechol are the most effective for strontium removal. Cesium selectivities of these bifunctional resins are 5 to 10 times higher than those of commercial resin CS-100. Strontium selectivities are comparable to those of commercial resin IRC-718. Total sodium capacity of these resins, which needs to be minimized for adequate interfacing with immobilization processes, is only slightly higher than that of such commercial resins. The column performance of the new resins is good. The process of preparing the exchange resins: dissolving iminodiacetic acid and resorcinol in water together at room temperature (1:1 mole ratio); adjusting the pH (8-10) with sodium hydroxide solution; adding excess formaldehyde (5-8 mole ratio); raising the temperature, 60°–140° C.; drying and curing concurrently to a hard, brittle stage; and grinding to size.

The foregoing description of preferred embodiments of the invention has been presented for purposes of illustration and description. It is not intended to be exhaustive or to limit the invention to the precise form disclosed, and obviously many modifications and variations are possible in light of the above teaching. For example, resorcinol-phenol-IDA condensate resins produce an increase in IDA incorporation into the polymer. This results in higher strontium selectivity. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. Process for the simultaneous recovery of cesium or strontium or both from an aqueous alkaline solution containing such cesium or strontium or both which comprises:
   (A) contacting said aqueous alkaline solution with a phenolic chelating resin material to sorb said cesium or strontium or both from said aqueous alkaline solution, said phenolic chelating resin material having been prepared by the process which comprises (i) reacting resorcinol with iminodiacetic acid or catechol in the presence of formaldehyde in an alkaline medium to form a condensation polymer gel, (ii) drying the condensation polymer gel, and (iii) comminuting the dried condensation polymer gel to form said phenolic cation exchange material; and
   (B) separating said aqueous alkaline solution depleted of cesium and strontium from the cesium-and-strontium-loaded phenolic cation resin material.

2. Method as claimed in claim 1 wherein, in step (a), resorcinol is reacted with iminodiacetic acid in the presence of formaldehyde.

3. Process as claimed in claim 12 wherein the aqueous alkaline solution is an aqueous alkaline nuclear waste solution containing cesium or strontium or both.

4. Process as claimed in claim 1 wherein said loaded resin is eluted with formic acid to recover said cesium and strontium.

5. Process for decontaminating an alkaline nuclear waste solution containing cesium and strontium values which comprises:
   (A) contacting said waste solution with a phenolic chelating ion exchange resin, said resin having been prepared by reacting resorcinol with iminodiacetic acid in the presence of formaldehyde at a pH of about 9 and temperature of about 95° C. to form a gel, and drying said gel at about 80° C. to form a resin material, and comminuting said dried resin material to form an ion exchange resin; and
   (B) recovering said solution which has been decontaminated of cesium and strontium.

* * * * *